United States Patent [19]

Warwick et al.

[11] Patent Number: 5,148,475
[45] Date of Patent: Sep. 15, 1992

[54] REDUCED CONTACT RESISTANCE ON A SLIC

[75] Inventors: Thomas P. Warwick, Melbourne; Robert Rood, Palm Bay, both of Fla.

[73] Assignee: Harris Corporation, Melbourne, Fla.

[21] Appl. No.: 505,899

[22] Filed: Apr. 6, 1990

[51] Int. Cl.$^5$ .......................................... H04M 19/00
[52] U.S. Cl. .................... 379/399; 379/402; 379/413
[58] Field of Search ............... 379/413, 402, 405, 399, 379/398

[56] References Cited

U.S. PATENT DOCUMENTS

| | | | |
|---|---|---|---|
| 4,314,106 | 2/1982 | Bakker | 379/413 X |
| 4,472,608 | 9/1984 | Beirne | 379/399 |
| 4,476,350 | 10/1984 | Auli et al. | 379/413 X |
| 4,484,032 | 11/1984 | Rosenbaum | 379/405 X |
| 4,706,281 | 11/1987 | Cubbison, Jr. | 379/398 X |
| 4,800,586 | 1/1989 | Meier | 379/399 |
| 4,803,721 | 2/1989 | Schingh | 379/413 X |
| 4,872,199 | 10/1989 | Kawami et al. | 379/398 X |
| 4,935,960 | 6/1990 | Takato et al. | 379/399 X |
| 4,961,219 | 10/1990 | Patel | 379/398 |
| 4,982,422 | 1/1991 | Itoh et al. | 379/413 X |

FOREIGN PATENT DOCUMENTS

| | | | |
|---|---|---|---|
| 0215168 | 12/1984 | Japan | 379/413 |
| 0314060 | 12/1988 | Japan | 379/413 |

Primary Examiner—James L. Dwyer
Assistant Examiner—M. Shehata
Attorney, Agent, or Firm—Barnes & Thornburg

[57] ABSTRACT

A SLIC includes in separate and distinct contacts for the output of a tip and ring line driver and their feedback resistors to the balancing resistor of the appropriate tip and ring line. Thus, a Kelvin contact arrangement is produced providing a compensation for the contact resistance of a single connection.

16 Claims, 1 Drawing Sheet

REDUCED CONTACT RESISTANCE ON A SLIC

BACKGROUND AND SUMMARY OF THE INVENTION

The present invention relates generally to telephone circuits and more specifically subscriber line interface circuits with reduced contact resistance.

Subscriber line interface circuits (SLIC) are well-known in the prior art. These circuits, which serve to connect the subscriber to a telephone exchange, typically include a current detector which performs several functions including detection of the subscriber going off-hook during ringing (ring-trip). In particular, when the subscriber is being called, AC ringing signals are applied to the subscriber loop to operate the telephone ringer. When the subscriber goes off-hook, the resulting loop current is detected to interrupt the ringing signals on the loop.

Another function performed by the SLIC is ringing and ring supervision. Ringing signals are generated in the SLIC and corresponding ring voltages are generated across the tip and ring terminals differentially. The SLIC includes a pair of line driving output amplifiers which drive the tip and ring lines respectively. As illustrated in FIG. 1, a SLIC 10 includes tip amplifier A1 and ring amplifier A2 driving a telephone exchange tip and ring line respectively through balancing resistors R1 and R2. The contact resistance of the connection of the tip and ring lines and their balancing resistors to the SLIC 10 is illustrated by contact resistance RC1 and RC2 respectively. The input or monitoring portion of the exchange tip and ring lines are provided from the balance resistors R1 and R2 to the SLIC 10 by separate connections.

The signal to be transmitted RX from the subscriber is received by the SLIC and coverted to a voltage $VR_x$. The contact resistance RC1 and RC2 not only affect the balancing of the exchanger tip and ring lines, but also their imbalance affect the frequency response of the system. For example, 100 milliohm contact resistance differential could cause a shift and longitudinal balance reading of $-63$ dB to $-52.1$ dB on a $-56$ dB signal.

We have considered synthetic resistance devices or circuitries for compensating for contact impedance, but determined them to be difficult to calibrate and requiring increased real estate on the SLIC.

Thus, it is an object of the present invention to provide a SLIC with reduced contact resistance between the exchange tip and ring line and tip and ring line drivers.

Another object of the present invention is to provide a simple method of reducing contact resistance in a SLIC.

These and other objects are attained by providing separate and distinct contacts for the output of a tip and ring line drivers and their feedback resistors to the balance resistor of the appropriate tip and ring line. Thus, a Kelvin contact arrangement is produced providing a compensation for the contact resistance of a single connection.

Other objects, advantages and novel features of the present invention will become apparent from the following detailed description of the invention when considered in conjunction with the accompanying drawings.

DETAILED DESCRIPTION OF THE DRAWINGS

Figure 1:
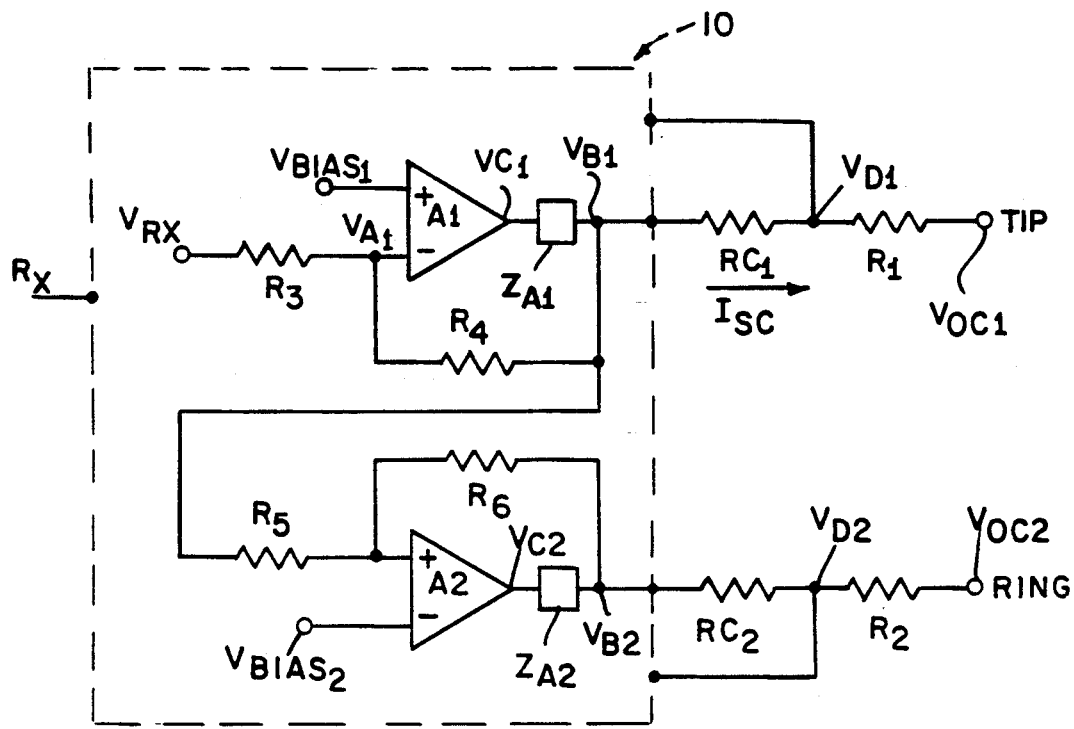
FIG. 1 is a schematic of the output drivers of a SLIC of the prior art.

The prior art SLIC 10 of FIG. 1 illustrates the voltage to be transmitted $V_{RX}$ applied through an input resistor R3 to a first driver operational amplifier A1. The other input terminal of operational amplifier A1 is connected to reference $V_{BIAS1}$. The output of the amplifier A1 is connected to a balancing resistor R1 and tip line connection TIP. The contact resistance is represented by resistor $R_{C1}$. The output impedance of the operational amplifier A1 is illustrated by $Z_{A1}$. A feedback resistor R4 provides a feedback between the output of the operational amplifier A1 and its input. A second operational amplifier A2 receives an input signal from the output of amplifier A1 through resistor R5. The other input to operational amplifier driver is connected to reference $V_{BIAS2}$. The output of operational amplifier A2 is connected to the ring terminal through balance resistor R2. The contact resistance is illustrated at $R_{C2}$ and the output impedance of the amplifier is $Z_{A2}$. A feedback resistor R6 is connected between the input and output of the operational amplifier A2.

The dotted line 10 illustrates the housing or the integrated circuit for the SLIC. The voltage at the negative input of the amplifiers is $V_A$, the voltage after amplification is $V_C$, the output voltage after the output impedance is $V_B$, the voltage after the contact impedance is $V_D$ and the voltage after the balancing resistor is $V_{OC}$. The input or monitoring portion of the exchange tip and ring lines are provided from the balance resistors R1 and R2 to the SLIC 10 by separate connections from the node of $V_D$.

Analyzing the output impedance for the top half of the circuit, including amplifier A1, the output impedance $Z_{OUT}$ is the output voltage after the contact impedance $V_{D1}$ divided by the short circuit current $I_{SC}$. The output voltage $V_{D1}$, assuming a negligible contact resistance $R_{C1}$, balancing resistor R1 and amplifier output impedance $Z_{A1}$ and that resistors R3 is equal to R4 which is equal to R, and the gain of the amplifier $A_1(S)$, is defined as follows:

$$V_{D1} = A_1(S)\left[ V_{BIAS1} - \left( \frac{R}{R+R} V_{RX} + \frac{R}{R+R} V_{D1} \right) \right] \quad (1)$$

$$= \frac{2 A_1(S)}{A_1(S) + 2}\left[ V_{BIAS1} - \frac{V_{RX}}{2} \right]$$

For the development of $I_{SC1}$:

$$V_{C1} = A_1(S) [V_{BIAS1} - V_{A1}] \quad (2)$$

$$V_{A1} = \frac{V_{RX}}{2} + \frac{V_{B1}}{2} \quad (3)$$

$$V_{B1} = I_{SC1} (R_{C1} + R_1) \quad (4)$$

$$V_{C1} = I_{SC1} [Z_{A1} + R_{C1} + R_1] \quad (5)$$

Substituting equations 3, 4 and 5 in equation 2 and simplifying:

$$I_{SC} = \frac{2 A_1(S) \left[ V_{BIAS1} - \frac{V_{RX}}{2} \right]}{A_1(S)(R_{C1} + R_1) + 2(Z_{A1} + R_{C1} + R_1)} \quad (6)$$

Dividing equation 1 by equation 2 and simplifying:

$$Z_{OUT1} = R_1 + \frac{2}{A_1(S) + 2} Z_{A1} + R_{C1}, \text{ for one leg, and} \quad (7)$$

$$Z_{OUT} = R_1 + R_2 + \frac{2}{A_1(S) + 2} Z_{A1} + \frac{2}{A_2(S) + 2} Z_{A2} + \quad (8)$$

$$R_{C1} + R_{C2}, \text{ for the both legs.}$$

An analysis of equation (8) will show that the first two terms $R_1$ and $R_2$ are the ideal output impedance, the next two terms represent the output impedance of the operational amplifier closed loop, and the next two terms $R_{C1}$ and $R_{C2}$ are then contact resistance.

Figure 2:
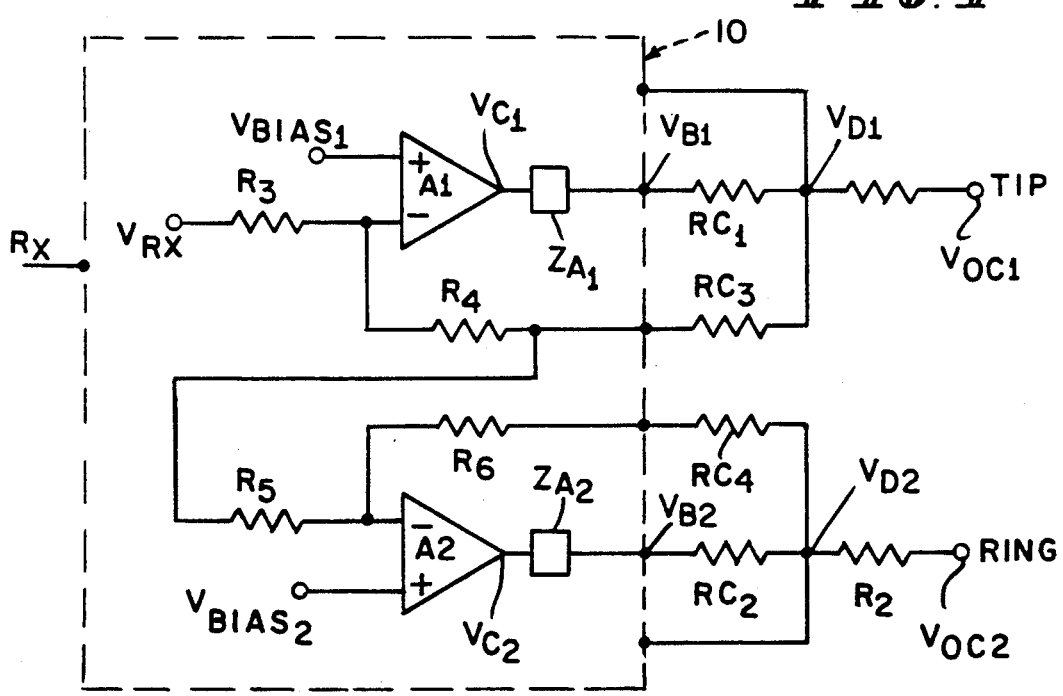
FIG. 2 is a schematic of the output drivers for a SLIC incorporating the principles of the present invention.

The present invention is illustrated in FIG. 2 and includes a contact or interconnect between the feedback resistor $R_4$ and $R_6$ and the balancing resistor $R_1$ and $R_2$ which are separate, distinct and independent from the contact of the output of the operational amplifier $A_1$ and $A_2$ to the balancing resistors $R_1$ and $R_2$. Thus, FIG. 2 includes a second contact resistance $R_{C3}$ and $R_{C4}$. This connection is considered a Kelvin contact. The connection for the node of $V_D$ is selected to be as close as possible to the balancing resistors $R_1$ and $R_2$. This reduces the voltage drop of a long lead line from the SLIC to the balancing resistors through $R_{C1}$ and $R_{C2}$ since the feedback path including $R_{C3}$ and $R_{C4}$ carries a very low current and thus a very small voltage drop, even with a long lead line. The effect on the output impedance will be described below.

As in FIG. 1, there is a separate connection from the balancing resistors $R_1$ and $R_2$ to the SLIC 10 for an input terminal of the tip and ring lines in FIG. 2.

For the mathematic analysis of the output resistance for FIG. 2, as in the previous example, the contact resistance $R_{C3}$ and $R_{C4}$ are substantially small and negligible. For example, $R_3$, $R_4$, $R_5$ and $R_6$ are generally in the range of greater than 100K ohms, whereas the contact resistances $R_{C1}$, $R_{C2}$, $R_{C3}$ and $R_{C4}$ are less than 1 ohm. The balancing resistors $R_1$ and $R_2$ are generally in the 50-100 ohm range. Thus, for FIG. 2, the output voltage $V_D$ for FIG. 2 is the same as for FIG. 1, and is represented by equation (1). With respect to equations (2)–(5), only equations (3) and (4) would be different as shown below as equations (3a) and (4a), resulting in the modification of equations (6) and (8) as shown below (6a) and (8a).

$$V_{A1} = \frac{V_{RX}}{2} + \frac{V_{D1}}{2} \quad (3a)$$

$$V_{D1} = I_{SC} R_1 \quad (4a)$$

$$I_{SC} = \frac{2 A_1(S)}{A_1(S) R_1 + 2(Z_{A1} + R_{C1} + R_1)} \left[ V_{BIAS1} - \frac{V_{RX}}{2} \right] \quad (6a)$$

$$Z_{OUT} = R_1 + R_2 + \frac{2}{A_1(S) + 2} Z_{A1} + \frac{2}{A_2(S) + 2} Z_{A2} + \quad (8a)$$

$$\frac{2 R_{C1}}{A_1(S) + 2} + \frac{2 R_{C2}}{A_2(S) + 2}$$

As with equation (8), in equation (8a) the ideal resistances are the first two terms $R_1$ and $R_2$, the next two terms are identical and represent the operational amplifier output impedance and the last two terms represent the total effect of the contact resistance.

Since the contact impedance of equation (8a) includes the gain of the amplifier, a gain of, for example, 1 would result in the contact resistance being two-thirds of what it would be in equation (8). As the gain is increased, the contact resistance plays a smaller and smaller role. Typical gains at the operating frequency of the SLIC are in the range of 1000 to 3000 and thus the effect of the contact resistance on the output impedance Zout is insignificant.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A subscriber line interface circuit for connecting a subscriber to a telephone exchange comprising:
    a tip amplifier, having an input and output, for driving a tip line;
    first contact means for connecting said output of said tip amplifier to said tip line;
    a first feedback resistor having a first terminal connected to said input of said tip amplifier and a second terminal;
    second contact means for connecting said second terminal of said first feedback resistor to said tip line distinct from said first contact means;
    whereby connection of said first and second contact means to said tip line creates a feedback loop from said tip amplifier output through said first contact means, said second contact means and said first feedback resistor to said tip amplifier input to form a Kelvin contact;
    a ring amplifier, having an input and an output, for driving a ring line;
    third contact means for connecting said output of said ring amplifier to said ring line;
    a second feedback resistor having a first terminal connected to said input of said ring amplifier and a second terminal; and
    fourth contact means for connecting said second terminal of said second feedback resistor to said ring line distinct from said third contact means;
    where by connection of said third and fourth contact means to said ring line creates a feedback loop from said ring amplifier output through said third contact means, said fourth contact means and said second feedbeck resistor to said ring amplifier input to form a Kelvin contact.

2. A subscriber line interface circuit according to claim 1, including a common housing for said ring and tip amplifiers and said first and second feedback resistors; and wherein said first, second, third and fourth contact means each include separate terminals on the exterior of said common housing.

3. A subscriber line interface circuit according to claim 2, including a first balance resistor connected to terminals of said first and second contact means and to be connected in series to said tip line; and a second balance resistor connected to terminals of said third and fourth contact means and to be connected in series to said ring line.

4. A subscriber line interface circuit according to claim 2, wherein said second terminal of said first feedback resistor is connected to said input of said ring amplifier.

5. A subscriber line interface circuit according to claim 1, wherein said second terminal of said first feedback resistor is connected to said input of said ring amplifier.

6. A subscriber liner interface circuit for connecting a subscriber to a telephone exchange comprising:
   a tip amplifier, having an input and output, for driving a tip line;
   first contact means for connecting said output of said tip amplifier to a tip line;
   a feedback resistor having a first terminal connected to said input of said tip amplifier and a second terminal; and
   second contact means for connecting said second terminal of said feedback resistor to said tip line distinct from said first contact means;
   whereby connection of said first and second contact means to said tip line creates a feedback loop from said tip amplifier output through said first contact means, said second contact means and said feedbeck resistor to said tip amplifier input to form a Kelvin contact.

7. A subscriber line interface circuit according to claim 6, including a common housing for said tip amplifier and said feedback resistor; and wherein said first and second contact means each include separate terminals on the exterior of said common housing.

8. A subscriber line interface circuit for connecting a subscriber line to a telephone exchange comprising:
   a ring amplifier, having an input and an output, for driving a ring line;
   third contact means for connecting said output of said ring amplifier to said ring line;
   a feedback resistor having a first terminal connected to said input of said ring amplifier and a second terminal; and
   second contact means for connecting said second terminal of said feedback resistor to said ring line distinct from said first contact means;
   whereby connection of said first and second contact means to said ring line creates a feedback loop from said ring amplifier output through said first contact means, said second contact means and said feedbeck resistor to said ring amplifier input to form a Kelvin contact.

9. A subscriber line interface circuit according to claim 8, including a common housing for said ring amplifier and said feedback resistor; and wherein said first and second contact means each include separate terminals on the exterior of said common housing.

10. A circuit having a gain stage for driving an AC load comprising:
   an amplifier, having an input and an output, for driving an AC load;
   first contact means for connecting said output of said amplifier to said AC load;
   a feedback resistor having a first terminal connected to said input of said amplifier and a second terminal; and
   second contact means for connecting said second terminal of said feedback resistor to said AC load distinct from said first contact means;
   whereby connection of said first and second contact means to said AC load creates a feedback loop from said amplifier output through said first contact means, said second contact means and said feedbeck resistor to said amplifier input to form a Kelvin contact.

11. A circuit according to claim 10, including a common housing for said amplifier and said feedback resistor; and wherein said first and second contact means each include separate terminals on the exterior of said common housing.

12. A circuit according to claim 10, wherein said circuit is a communication circuit and said gain stage is in an interface portion of said circuit.

13. A subscriber line interface circuit for connecting a subscriber to a telephone exchange comprising:
   a tip amplifier, having an input and output, for driving a tip line;
   first contact means for connecting said output of said tip amplifier to said tip line;
   a first feedback resistor having a first terminal connected to said input of said tip amplifier and a second terminal;
   second contact means for connecting said second terminal of said first feedback resistor to said tip line distinct from said first contact means to form a Kelvin contact;
   a first balance resistor connected to said first and second contact means and to be connected in series to said tip line
   a ring amplifier, having an input and an output, for driving a ring line;
   third contact means for connecting said output of said ring amplifier to said ring line;
   a second feedback resistor having a first terminal connected to said input of said ring amplifier and a second terminal;
   fourth contact means for connecting said second terminal of said second feedback resistor to said ring line distinct from said third contact means to form a Kelvin contact; and
   a second balance resistor connected to said third and fourth contact means and to be connected in series to said ring line.

14. A subscriber line interface circuit for connecting a subscriber to a telephone exchange comprising:
   a tip amplifier, having an input and output, for driving a tip line;
   first contact means for connecting said output of said tip amplifier to said tip line;
   a feedback resistor having a first terminal connected to said input of said tip amplifier and a second terminal;
   second compact means for connecting said second terminal of said feedback resistor to said tip line distinct from said first contact means to form a Kelvin contact; and
   a balance resistor connecting to said first and second contact means and to be connected in series to said tip line.

15. A subscriber line interface circuit for connecting a subscriber line to a telephone exchange comprising:
   a ring amplifier, having an input and output, for driving a ring line;

first contact means for connecting said output of said ring amplifier to said ring line;

a feedback resistor having a first terminal connected to said input of said ring amplifier and a second terminal;

second contact means for connecting said second terminal of said feedback resistor to said ring line distinct from said first contact means to form a Kelvin contact; and a balance resistor connected to said first and second contact means and to be connected in series to said ring line.

16. A circuit having a gain stage for driving an AC load comprising:

an amplifier, having an input and an output, for driving an AC load;

first contact means for connecting said output of said amplifier to said AC load;

a feedback resistor having a first terminal connected to said input of said amplifier and a second terminal;

second contact means for connecting said second terminal of said feedback resistor to said AC load distinct from said first contact means to form a Kelvin contact; and a balance resistor connected to said first and second contact means and to be connected in series to said AC line.

* * * * *